United States Patent [19]

Galle

[11] Patent Number: 5,257,717

[45] Date of Patent: Nov. 2, 1993

[54] METHOD OF MANUFACTURING A COOKING UTENSIL

[75] Inventor: Alfred Galle, Idar-Oberstein, Fed. Rep. of Germany

[73] Assignee: AMC International Alfa Metalcraft Corporation AG, Rotkreuz, Switzerland

[21] Appl. No.: 922,336

[22] Filed: Jul. 30, 1992

[30] Foreign Application Priority Data

Jul. 30, 1991 [DE] Fed. Rep. of Germany ....... 4125115

[51] Int. Cl.⁵ ...................... B21D 39/00; B23K 31/02
[52] U.S. Cl. ................ 228/173.6; 228/175; 228/184; 228/265
[58] Field of Search ............... 228/175, 184, 155, 265, 228/173.6, 263.16

[56] References Cited

U.S. PATENT DOCUMENTS

| 2,908,073 | 10/1959 | Dulin | 228/243 |
|---|---|---|---|
| 3,037,275 | 6/1962 | Schmitz | 228/173.6 |
| 3,199,188 | 8/1965 | Ottinge | 228/155 |
| 3,295,197 | 1/1967 | Bunn et al. | 228/175 |
| 3,904,101 | 9/1975 | Beltran et al. | 228/175 |
| 3,919,763 | 11/1975 | Ulam | 228/263.16 |
| 4,029,253 | 6/1977 | Cartossi | 228/175 |
| 4,782,993 | 11/1988 | Cartossi | 228/184 |
| 5,064,055 | 11/1991 | Bessenbach | 220/626 |

FOREIGN PATENT DOCUMENTS 0209745 10/1989 European Pat. Off.
2258795  1/1977 Fed. Rep. of Germany.

OTHER PUBLICATIONS

"Die Verbindungsgüte in Edelstahl-Aluminum-Gefässböden", Article in: Materialprüfung 33 (1991), 4, pp. 89-91.

Primary Examiner—Mark Rosenbaum
Assistant Examiner—Chuck Y. Mah
Attorney, Agent, or Firm—Herbert Dubno; Yuri Kateshov

[57] ABSTRACT

A method of manufacturing a cooking utensil comprising a round container for the food. The container comprises a container, a plate made of heat-conducting material and a cap enclosing the plate, the cap being made from a sheet-metal disk and having a base provided with a convex curvature towards the container and also having collar which bears against the round container in a curved transition region between the container base and the container jacket. The container and the cap are made of stainless steel. The plate is intermetallically bonded to the container base and the cap. The plate, the sheet-metal disk and the container base are centered and connected by a central spot weld, using electric resistance welding. Next, the intermetallic bond is produced by single or multiple impulse pressure and permanent deformation and the cap collar is formed on the sheet-metal disk and its rim is placed around the container. Use is made of a sheet-metal disk having an edge which, during the shaping of the cap collar, is permanently deformed and pressed against the container. The sheet-metal disk, the plate and the container base are centered by the resistance welding so as to be resistant to impulse pressure. The pulse pressure is exerted so as to produce the convex curvature in the cap bottom. During impulse pressure, the air is first expelled from the region between the sheet-metal disk and the cap collar in process of formation. During and after this process, a seal is produced in the form of permanent deformation with regard to the plastic deformation of the plate material.

7 Claims; 3 Drawing Sheets

METHOD OF MANUFACTURING A COOKING UTENSIL

CROSS REFERENCE TO RELATED APPLICATION

This application is related to the concurrently filed commonly owned copending application Ser. No. 07/922,330 based upon German application No. P 41 25 114.8 filed 30 Jul. 1991, now pending.

FIELD OF THE INVENTION

The invention relates to a process for manufacturing a cooking utensil comprising a round container for the food, the container comprising a base, a plate of heat-conducting material and a cap enclosing the plate, the cap being made from a sheet-metal disk and having a base formed with a convex curvature towards the container and also having a collar which abuts the round container base and the container jacket, the container and the cap being made of stainless steel and the plate being intermetallically bonded to the container base and the cap.

BACKGROUND OF THE INVENTION

A method of making cooking utensils can have the plate, the sheet-metal disk and the container base centered and joined by electric resistance heating to produce a central spot weld, after which the intermetallic bond is produced by single or multiple pulse pressure and plastic deformation; the cap collar can be formed on the sheet-metal disk and its rim is placed around the container. Of course this process, on which the invention is based, and consequently the method according to the invention also, can be carried out at ambient temperature or with heating.

The impulse energy will be adjusted to the temperature of the container, at least in the base region, the cap and the plate. Usually these temperatures are chosen so as to be near but sufficiently below the melting-point of the plate material. Aluminum, in the form of industrially pure aluminum, is a very useful plate material. Copper is also a useful plate material. The cooking utensils can be pots, pans or the like, more particularly, cooking pots and pressure cookers. The plate improves the heat transfer from a hotplate or stove plate to the food. The heat transfer is adversely affected if the intermetallic bond is damaged. This applies particularly when a defect occurs in the collar region since experience shows that it can propagate from there when the utensil is in use.

The known method on which the invention is based (German Pat. No. DE-PS 22 58 795) does not result in a cooking utensil having a cap base which has a convex curvature towards the container. Instead, the process yields a substantially flat cap bottom. Use is made of a flat sheet-metal disk, the edge of which cannot and is not designed to be permanently deformed against the container when the collar is formed on the cap. The aim is only to shape or bevel the edge of the sheet-metal disk for closely fitting to the container. To this end, the disk diameter is less than the rated outer diameter of the pot. The impulse pressure shapes the flat cap bottom, forming the collar in the same process. It has been found in practice that this cannot ensure a faultless intermetallic bond between the cap, the cap bottom, the cap collar and the plate or between the plate and the container base. Frequently, the centering obtained before impulse pressure, is destroyed and the product has to be rejected.

In another known method (European patent application no. Ep 0 209 745) the procedure is as follows: the plate is secured by spot welding to the base of the preformed cap. The assembly comprising the cap, plate and container base or container is heated to a temperature which is near but below the melting-point of the plate material.

The initial thickness of the plate is at least 20% greater than the final thickness of the plate after the intermetallic bond has been formed.

In a first phase of pulse pressure, the pressure is applied progressively from the center to the edge of the assembly so as to obtain a special convexity, i.e. so that the total curvature of the convexity of the shaped plate and of the container is not less than 0.5% of the average diameter of the container base in its final shape. This impulse driving air from the center outwards, out of the assembly comprising the container base, plate and cap.

The known method, however, results in constraints which restrict the usefulness of the previously-described steps. This is because of the conditions, i.e. on the one hand the initial thickness of the plate must be at least 20% greater than the final thickness thereof after manufacture of the intermetallic bond, and on the other hand the convexity must be adjusted as previously described.

Also it is not clear from the reference that there should be a spot-welded connection at the center and that the connection should be resistant to impulse pressure.

If the spot-welded connection breaks during pulse pressure, it is impossible to prevent displacement during the pressure pulse. Consequently these can be no guarantee of an intermetallic bond meeting all requirements even at the rim of the plate and at the collar on the cap.

In reality, however, it is very important to have a faultless intermetallic bond overall, particularly in the region of the cap bottom (compare the periodical "Materialprüfung" 33 (1991) 4, pages 89 to 91).

There has not been available an automated process for ensuring a bond in systems of the type described, unless the starting material is a relatively flat sheet-metal disk instead of a preformed enclosing cap.

OBJECTS OF THE INVENTION

The object of the invention is to improve the previously-described process of (DE 22 58 795) so that a cooking utensil having the initially-described construction can be manufactured with a cap bottom and a cap collar which have a convex curvature towards the container and meet all requirements.

Another object of the invention is to provide an improved method of making a cooking utensil whereby drawbacks of earlier systems are avoided.

SUMMARY OF THE INVENTION

To this end, according to the invention, use is made of a sheet-metal disk having an edge which, during the shaping of the cap collar, can be permanently deformed while being pressed against the containers. The sheet-metal disk, the plate and the container base are centered by the resistance welding so as to be resistant to impulse pressure. The pulse pressure is applied so as to give a convex curvature to the base of the cap and, during the application of the pulse pressure, firstly the air is driven out of the region between the disk and the cap, in process of formation, after which a seal is produced by permanent deformation with respect to the plastic deformation of the plate material, and a collar is formed on the plate material and is pressed into the region of the seal.

Of course, the tools, i.e. the die and punch for exerting impulse pressure in a press, must be adjusted so as to obtain the previously emphasized slight convex shaping of the bottom of the cap. Usually the container base is slightly convex outwards. Of course also, the geometrical conditions with regard to the container base the cap and the plate must be adjusted so that in the finished cooking utensil, the plate completely fills the space between the container base and the cap, i.e. during intermetallic bonding the plate forms a collar which projects in sealed-tight or very sealed-tight manner into the region of the aforementioned seal.

A defined, undisturbed flow of plate material is important for the intermetallic bond. The plate can be a flat plate or can have a lenticular or stepped cross-section.

Optionally according to the invention, the surface of the cap and the container base facing the plate are treated or modified so as to assist the intermetallic bonding, e.g. by etching, roughening or the like. It is particularly important also that the rim of the cap collar should faultlessly abut the container. If plate material flows out here, the container will have to be rejected for aesthetic reasons and to avoid corrosion. If there is a gap, water can enter during use of washing and can cause trouble through corrosion.

Advantageously, I can use a plate having a thickness which, before plastic deformation in the cold state, is not more than 16% greater than after plastic deformation. Although this excess thickness of the plate is relatively small, the invention results in a faultless intermetallic bond.

The aforementioned shaping of the cap collar with permanent deformation against the container during pulse pressure can be obtained without difficulty if use is made of a sheet-metal disk having a diameter greater than the nominal outside diameter of the pot. Preferably the thickness of the sheet metal is about equal to the thickness of the metal forming the container. The disk may even be up to 20% thinner than the sheet metal forming the container base.

As already mentioned, the method according to the invention can be carried out at ambient temperature or with deformation by heating. In the latter case, in a preferred embodiment of the invention, the pulse pressure is exerted on the container, the cap and the plate at a temperature near the melting point of the plate, and the pulse pressure tools are used at a temperature in the range from 100° to 350° C.

Surprisingly, the method according to the invention can be used to make a container of the initially described kind and having a cap, a cap collar and a cap bottom which is convex towards the container, which satisfies all requirements even though, during application of pulse pressure, the cap is made from a collarless sheet-metal disk, so that there is no need to prefabricate a cap with a collar. This is because the previously-described steps are combined in operation.

The permanent deformation is brought about exactly at the spot determined by the construction and can be highly accurate, because the welded connection is resistant to pulse pressure.

A weld resistant to pulse pressure can be made by electric resistance welding, if sufficient energy is supplied. It is possible particularly because a relatively thin plate is used according to the invention. The deformation of the plate by plastic pressure, with simultaneous shaping of the cap, results in an extremely firm, strong intermetallic bond in this important region, without interfering with the centering.

The edge of the cap touches and seals the container, both during manufacture and after cooling. There is no gap between the container base and the cap, so that water cannot enter during use or washing and there is no observed trouble from corrosion.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
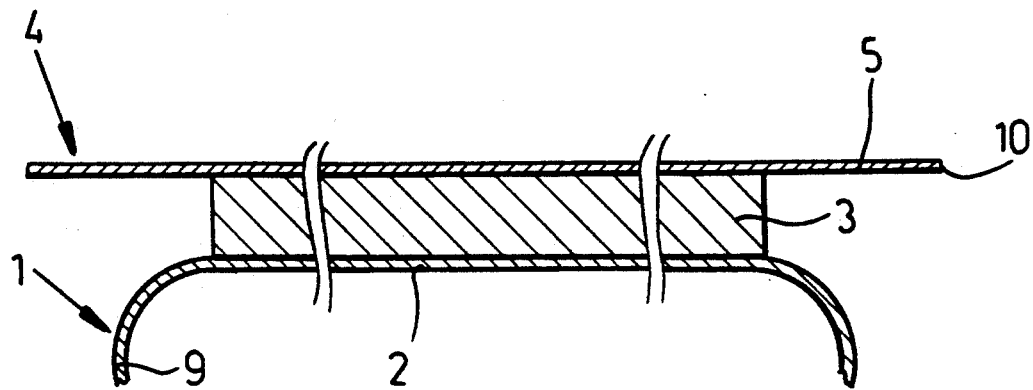
FIG. 1 is a vertical section through the components of a cooking utensil manufactured using the process according to the invention.
Figure 2:
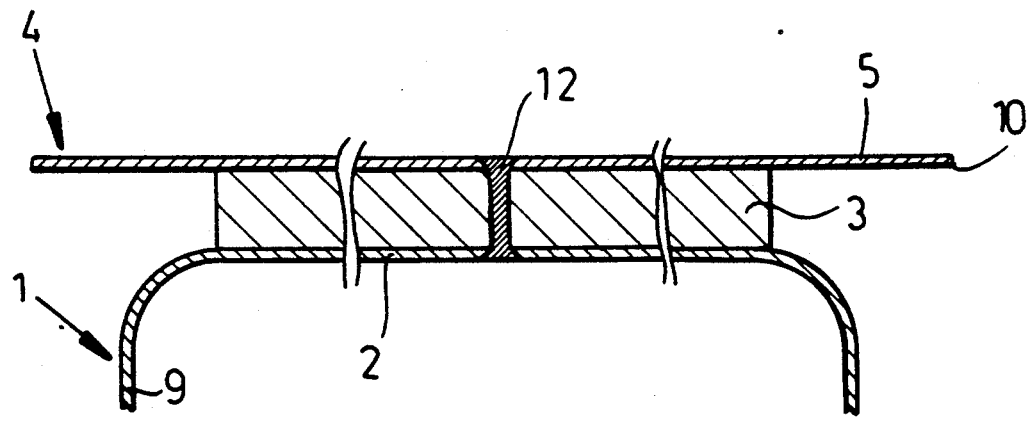
FIG. 2 shows the components of FIG. 1 after centering by electric resistance welding with a central spot weld.
Figure 3:
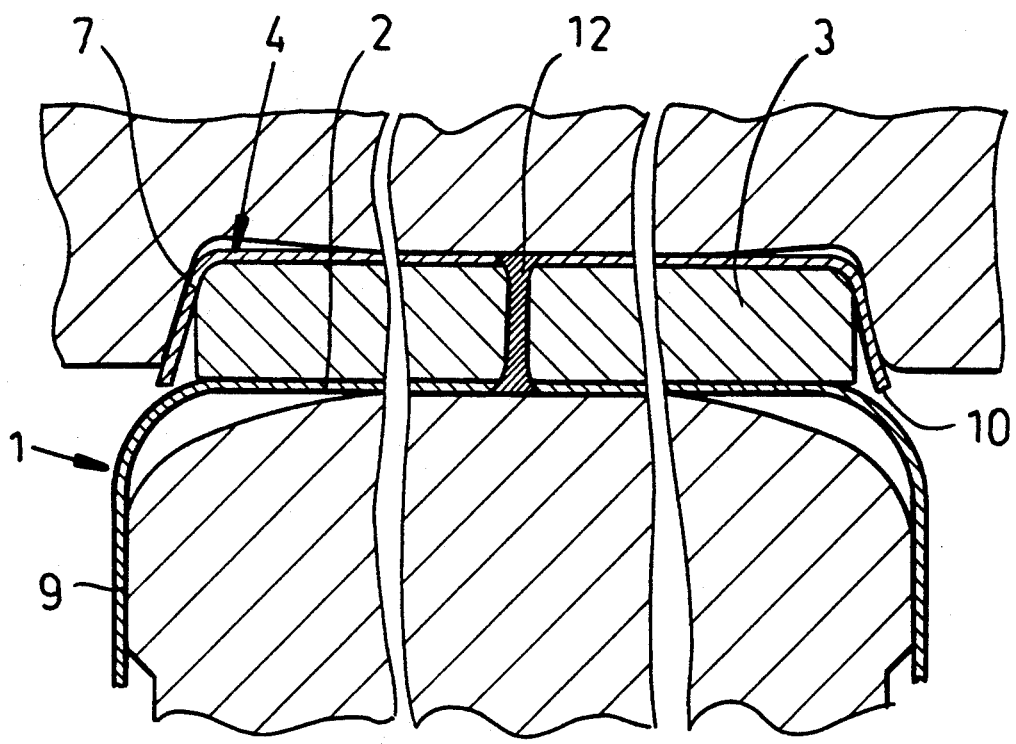
FIG. 3 shows the article of FIG. 2 in the tools likewise in vertical section, of a press for carrying out the process according to the invention.

FIGS. 1 to 3 show the components for producing a cooking utensil comprising a round container 1 for the food. The drawing shows a container base 2, a plate 3 of heat-conducting material and a cap 4 over the plate 3. The cap 4 is made from a sheet-metal disk 5.

Figure 4:
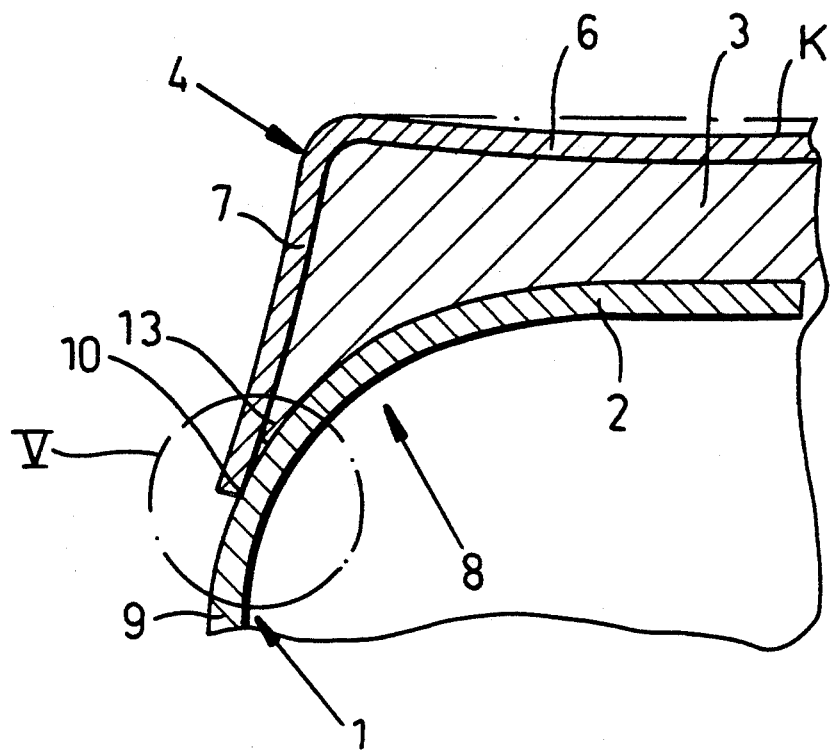
FIG. 4 is a partial vertical section through the resulting cooking utensil.
Figure 6:
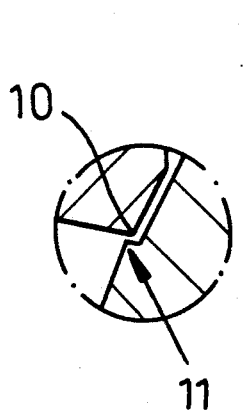
FIG. 6 is a detail of the portion VI of FIG. 5.

As shown in FIG. 4 the bottom 6 of the cap 4 is given a convex curvature K towards the container base 2 and has a collar 7 which abuts against the round container 1 in a curved transition region 8 between the container base 2 and the container jacket or wall 9. The container 1 and the cap 4 are made of stainless steel. Plate 3 is intermetallically bonded to the container base 2 and the cap 4.

As a comparison between FIGS. 1 and 2 shows, a flat sheet-metal disk 5 is used in order to obtain the complete cap 4 by the method according to the invention. The sheet-metal disk 5 is shaped and dimensioned so that when a collar 7 is formed on the cap, the edge 10 of the disk is pressed with permanent deformation 11 against the container 1. To this end its diameter is greater than the rated outer diameter of the pot, as shown in exaggerated form in FIGS. 1 and 2. In practice the difference in diameter is a few millimeters, e.g. 3 to 5 mm. As FIG. 2 shows, the sheet-metal disk 5, the plate 3 and the container base 2 are welded by resistance welding, at a suitably-sized spot weld 12 at the center, so as to be resistant to pulse pressure. For clarity, this is shown in exaggerated form in FIGS. 2 and 3.

Figure 5:
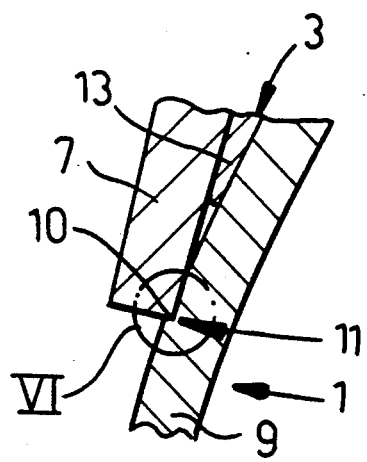
FIG. 5, on a much larger scale, shows a part V of the article in FIG. 4.

As FIG. 3 shows, pulse pressure is or can be exerted so as to form the convex curvature K on the cap base 6. As a result of the shaping process, during pulse pressure the air is first expelled from the region between the disk 5 and the collar 7 in the process of formation, during or after which the permanent deformation 11 is produced (see FIG. 5). The permanent deformation 11 acts as a seal with regard to the plastic deformation of the plate material. As a result, the plate material forms a collar 13 which presses into the region of the seal at 11 (see FIGS. 4 and 5). The thickness of the plate 3 before plastic deformation and when cold may be up to 16% greater than after plastic deformation. As the example shows, use was made of a sheet-metal disk 5 about equal in thickness to the sheet-metal forming the container 1. The pressure pulse is exerted on the container, the cap and the plate at a temperature near the melting point of the plate. The temperature of the pair of pressure tools between which the disk is pressed ranges from 100° to 350° C. The sheet metal disk should have a thickness which is not more than 20% less than the wall thickness of the container.

I claim:

1. A method of manufacturing a cooking utensil comprising the steps of:
    (a) assembling a container comprising a bottom, a plate of heat-conducting material lying against said bottom and a cap enclosing the plate, the cap being made from a sheet-metal disk and having a base formed with a convex curvature towards the container and also having a collar which abuts a round portion of the container in a curved transition region between the container bottom and a wall of the container, the container and the cap being made of stainless steel,
    (b) centering the plate, the sheet metal disk and the container bottom being centered and joining the center and assembled by electric resistance welding to produce a central spot weld resistant to pulse pressure, and
    (c) forming an intermetallic bond between said plate, said container bottom and said cap by at least one shot of pulse pressure and plastic deformation and forming a cap collar on the sheet-metal disk with a rim pressed against the container, said cap being formed from a sheet-metal disk and having an edge, said step of forming the intermetallic bond including the steps of:
    ($c_1$) applying the pulse pressure so as to give a convex curvature to the base of the cap,
    ($c_2$) simultaneously with step ($c_1$) driving the air out of a region between the disk and the cap,
    ($c_3$) simultaneously with step ($c_2$) forming a recess in said container by pressing the edge thereagainst, said recess being formed with respective surfaces formed complementary to said edge upon contact therebetween the edge and the container,
    ($c_4$) permanently pressing said edge against said recess, thereby producing a seal upon permanent deformation during plastic deformation of the plate material, and
    ($c_5$) forming a collar on the plate material and pressing the collar into a region of the seal.

2. The method according to claim 1 wherein said plate has a thickness which, before plastic deformation in the cold state, is not more than 16% greater than after plastic deformation.

3. The method according to claim 1 wherein said sheet-metal disk has a diameter greater than a nominal outside diameter of the container.

4. The method according to claim 1 wherein said sheet-metal disk has a thickness about equal in thickness to sheet metal forming the container.

5. The method according to claim 1 wherein said sheet-metal disk is not more than 20% thinner than sheet metal forming the container.

6. The method according to claim 1 wherein the pulse pressure is exerted on the container, the cap and the plate at a temperature near the melting-point of the plate, and the pulse pressure tools are used at a temperature in the range from 100° to 350° C.

7. A method of making a cooking utensil which comprises the steps of:
    forming a pot having a substantially flat bottom, a rounded transition region surrounding said bottom and a substantially cylindrical wall adjacent said transition;
    applying to said bottom a circular plate having a diameter substantially equal to a diameter of said bottom and so that said plate does not project beyond said bottom over said transition region;
    providing on said plate, a sheet-metal disk of a diameter greater than said plate so that a rim of said disk projects beyond said plate;
    centering said disk and said plate on said bottom by spot welding said disk and said plate to said bottom substantially at centers of said disk, said plate and said bottom;
    pressing said disk, said plate and said bottom between a pair of tools including an inner tool within said container bearing on said bottom and having a convex shape and an outer tool bearing on said disk and said plate and shaped to impart an outwardly concave curvature to said disk while bending said rim inwardly toward said transition region;
    forming a recess in said transition region having a surface complementary to and abutting said rim brought in contact with said recess upon said pressing, providing thereby a seal between the inwardly bent rim and said transition region; and
    applying at least one shot of pulse pressure of a magnitude and at a temperature so as to permanently, plastically deform said plate into said seal along said transition region while intermetallically bonding said disk to said plate and said plate to said container.

* * * * *